United States Patent Office 2,949,137
Patented Aug. 16, 1960

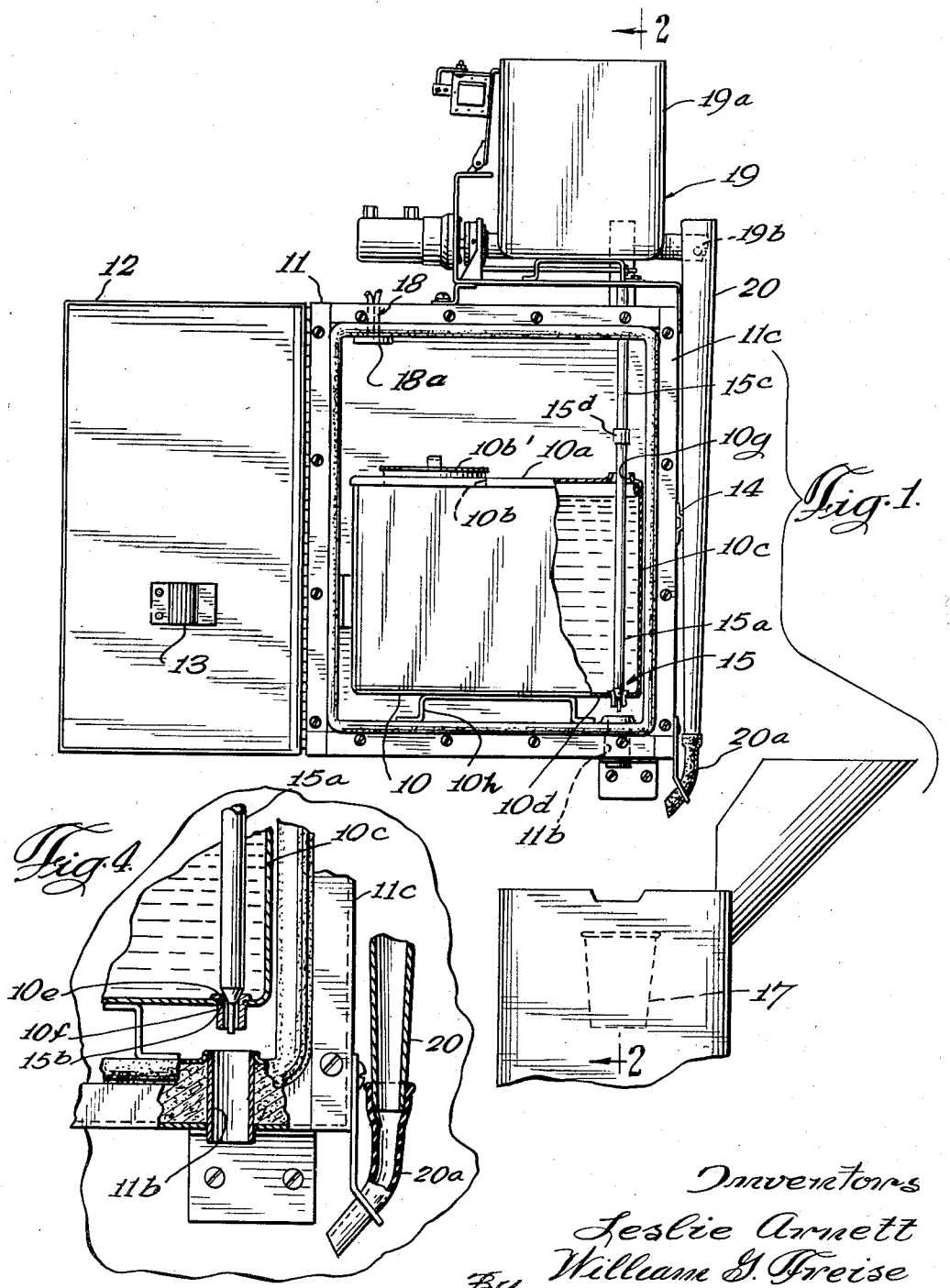

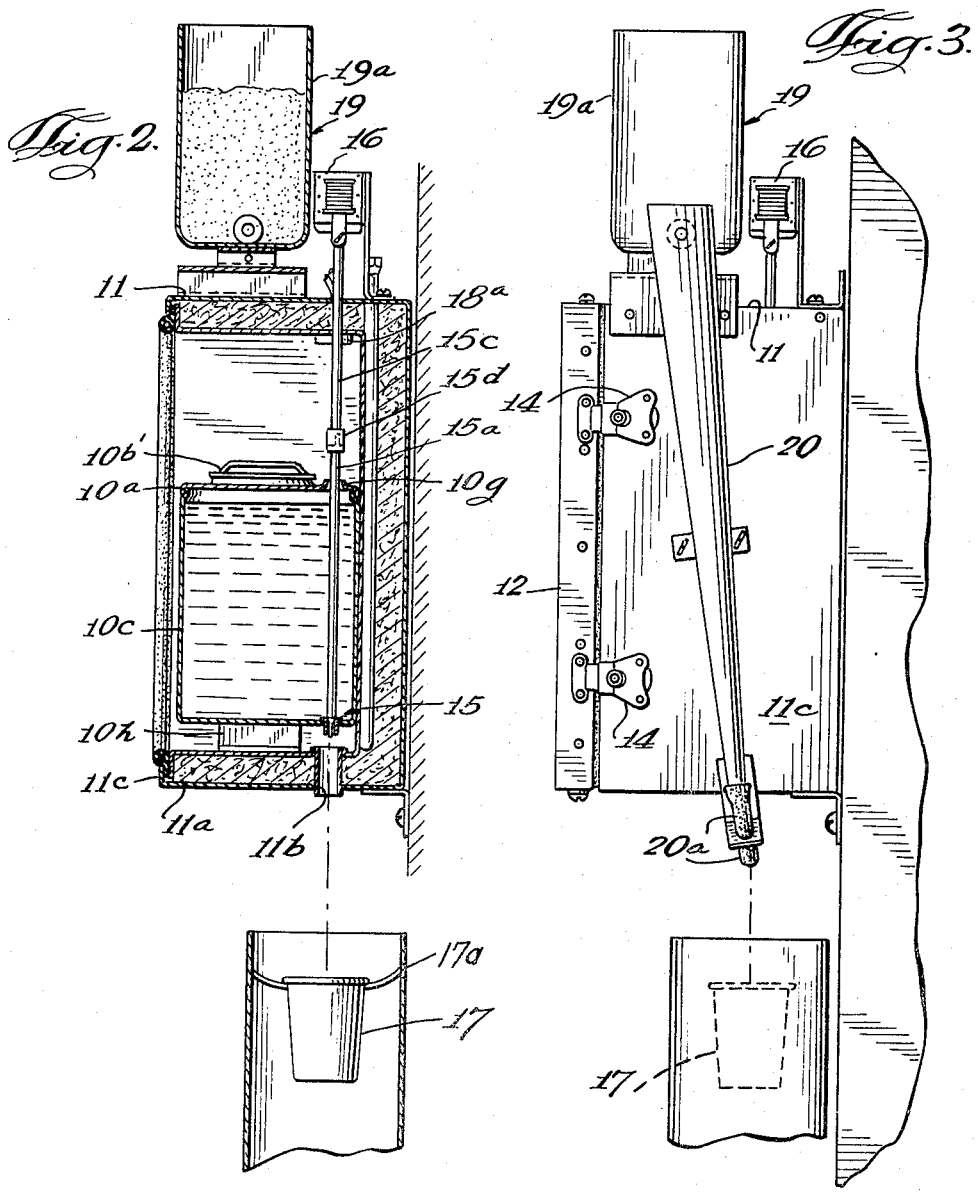

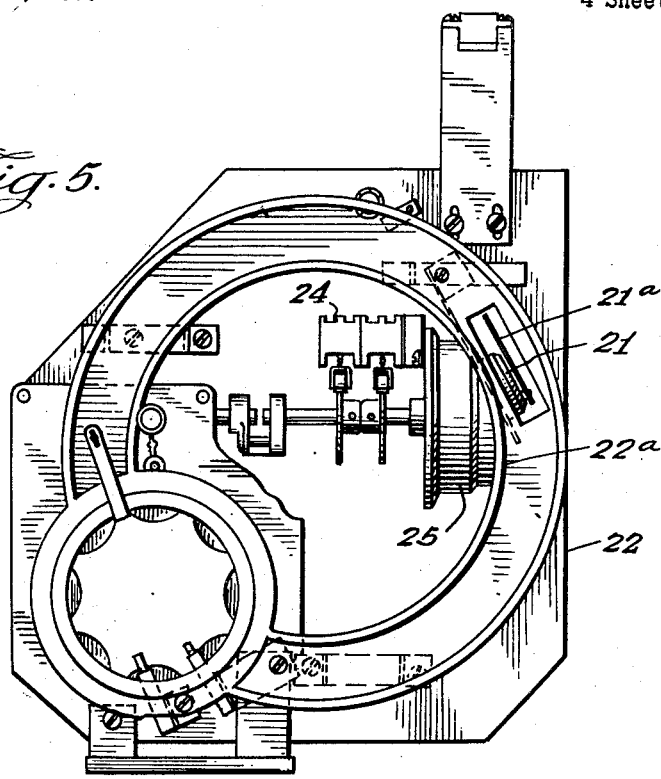
Fig. 5.
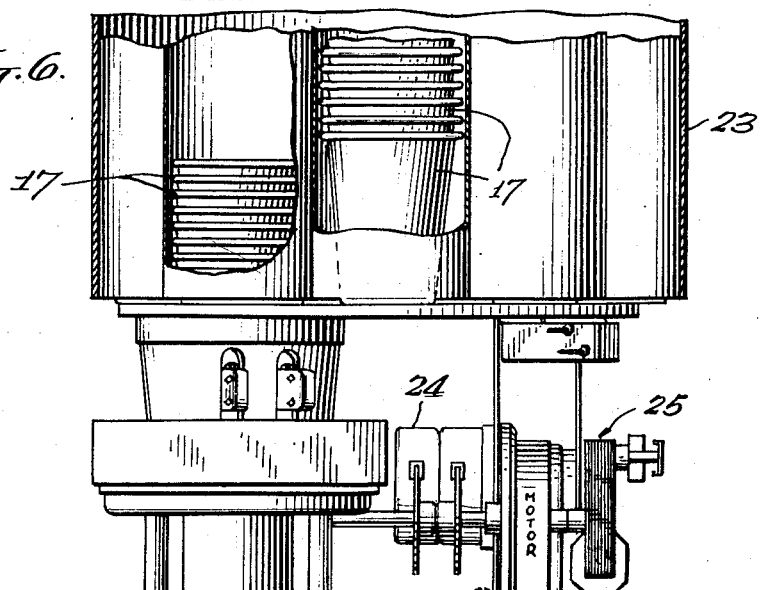
Fig. 6.
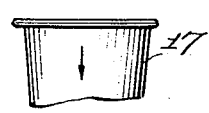

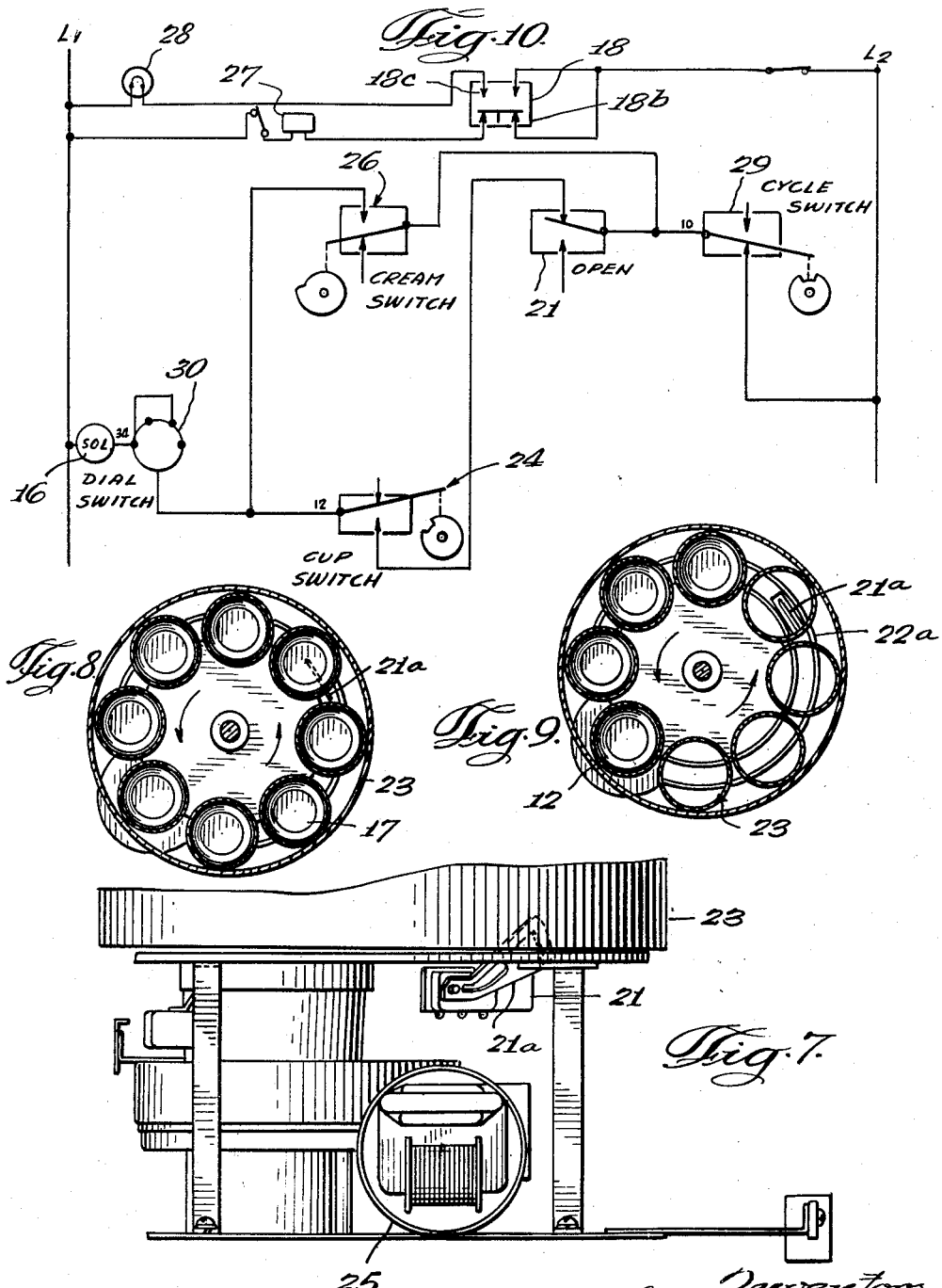

2,949,137
LIQUID DISPENSER

Leslie Arnett and William G. Freise, Chicago, Ill., assignors to United Coffee Corp., Chicago, Ill., a corporation of Delaware Filed Aug. 10, 1956, Ser. No. 603,368

7 Claims. (Cl. 141—9)

This invention relates to a beverage dispenser and more particularly to a beverage ingredient dispensing device for use therein.

It is desirable in beverage dispensers to provide means for storing and dispensing beverage ingredients, such as liquid cream or sugar, of a readily maintainable construction and which preclude portions of the beverage ingredients collecting and coagulating or spoiling therein. It is further desirable in such devices to maintain the temperature of certain ingredients within certain limits, such as maintaining liquid cream below 50° F., and simple yet effective means for accomplishing this must be provided.

A principal feature of this invention is the provision of a new and improved liquid beverage ingredient dispenser arranged to minimize effectively tendency of the ingredient to collect in portions thereof and become deleterious.

Another feature is the provision of such a cream dispenser wherein the beverage ingredient is dispensed directly from the storage container to the cup without means of an outlet duct.

A further feature is the provision of a beverage dispenser having a cream dispensing device wherein the cream is dispensed to fall freely into the cup without utilizing an outlet duct and wherein the cream container is disposed within a refrigerated enclosure from which it is readily removable for maintenance purposes.

A still further feature is the provision of a beverage dispenser having a cream dispenser as described above wherein a powdered sugar dispenser is mounted above the top of the cream dispenser and is provided with a discharge chute running around the cream dispenser to terminate laterally of the path of flow of the cream and above the cup, with the container for holding the sugar in the sugar dispenser being readily removable therefrom for maintenance purposes.

Still another feature is the provision of a beverage dispenser having means for compensating for a drop in the hydrostatic pressure head of the liquid beverage ingredient, which head causes the flow of ingredient through a discharge outlet at the bottom of the container, to maintain substantially constant the quantity of beverage ingredient dispensed to each of a plurality of cups.

Yet another feature is the provision in such a beverage dispenser of means on a cup dispenser thereof, responsive to the dispensing of a predetermined number of cups from the dispenser to actuate valve means for controlling the beverage ingredient container outlet to dispense an additional amount thereof to compensate for a reduction in the quantity of ingredient originally dispensed into a cup during the normal fixed time of opening of the valve means, caused by the reduced hydrostatic pressure head of the ingredient in the container.

A further feature is a provision of a beverage dispenser having a liquid beverage ingredient container provided with a discharge hole in the bottom thereof, an enclosure surrounding the container and having a hole in the bottom thereof in registry with the container hole, and means for maintaining a desired temperature within the enclosure.

Another feature is that the container is adapted to hold cream and the enclosure is refrigerated, with means being additionally provided for preventing the operation of the beverage dispensing machine should the temperature within the enclosure rise at any time above a predetermined point.

Still another feature is that the means for rendering the beverage dispenser inoperative subsequent to the elevation of the enclosure temperature must be reset manually, the operation thereof being indicated by a suitable signal.

Further features and advantages will be readily apparent from the following specification and drawings, in which:

Figure 1 is a front elevation of a beverage ingredient dispenser embodying the invention, with a cup dispenser associated therewith shown fragmentarily;

Figure 2 is a sectional view taken approximately along the line 2—2 of Figure 1;

Figure 3 is a side elevation thereof;

Figure 4 is an enlarged, fragmentary section thereof showing the valve and ingredient delivery means;

Figure 5 is a top plan view of a cup dispenser embodying the invention;

Figure 6 is a front elevation of the cup dispenser of Figure 5 with a plurality of cups and a storage enclosure for use therewith shown fragmentarily;

Figure 7 is a fragmentary side elevation thereof;

Figure 8 is a diagrammatic horizontal section of the cup dispenser showing the arrangement thereof when fully loaded with cups;

Figure 9 is a diagrammatic section similar to that of Figure 8 showing the arrangement thereof when one-half of the cups have been dispensed; and Figure 10 is a schematic diagram showing the electrical devices and circuitry of the invention.

In the exemplary embodiment of the invention as disclosed in the drawings, a liquid beverage ingredient dispenser and a powdered beverage ingredient dispenser for use in a beverage dispensing machine are mounted therein in dispensing relationship to a receptacle, such as a cup, dispensed from a suitable cup dispenser. While the invention comprehends the use of the dispensers with any of a plurality of desired beverage ingredients for purposes of illustrating the invention, the liquid beverage ingredient is hereinafter considered to be cream and the powdered ingredient is considered to be sugar, these ingredients serving as flavoring ingredients in a coffee dispensing machine, such as disclosed in copending applications Serial No. 336,563, filed February 12, 1953, now Patent No. 2,761,200, dated September 4, 1956, and Serial No. 540,252, filed October 13, 1955.

Particular reference now being had to Figures 1-4, the cream dispenser is seen to comprise a container 10 received within an insulated enclosure 11, which may be refrigerated by suitable means (not shown). An access door 12 is provided on the enclosure allowing ready insertion and removal of the container 10 into and from the enclosure when desired. To hold the container against movement within the enclosure, door 12 may be provided with a suitable spring member 13 which when the door is closed, bears against the outer side of the container and holds the container against the rear wall of the enclosure. Means for securing the door in the closed position may comprise suitable latches 14.

Container 10 comprises a tank formed of suitable material such as stainless steel adapted to hold a predetermined quantity of cream. A typical quantity for use in a coffee dispensing machine would be approximately 1¾ gallons. Extending across the top of the tank is a cover 10a which is readily removable to allow cleaning of the tank interior. An opening 10b is provided in cover 10a through which the tank may be filled, and a closure 10b' is removably disposed across the opening. Preferably adjacent a side wall 10c of the tank in the bottom 10d thereof is an outlet opening 10e through which is passed an annular valve seat 10f to be sealingly secured to the tank bottom and through which the cream may pass to be dispensed under the control of a suitable valve device 15.

A second opening 10g is provided in cover 10a of container 10 in vertical registry with outlet opening 10e and a movable valve rod 15a extends into the tank through opening 10g to have a lower frusto-conical surface 15b fit against valve seat 10f to close outlet 10e when desired. Means for operating valve rod 15a are mounted exteriorly on enclosure 11 and may comprise an electric solenoid 16. A connecting rod 15c serves to connect rod 15a to solenoid 16 through a readily disconnectable coupling ring 15d. A preferred form of valve 15 is that shown in our copending application Serial No. 546,977, filed November 15, 1955, now Patent No. 2,912,145, dated November 10, 1959.

Means for spacing tank bottom 10d above bottom 11a of enclosure 11 are provided and may comprise a support 10h. Directly below tank outlet 10e, enclosure bottom 11a is provided with a cylindrical hole or passage 11b through which cream may fall freely from outlet 10e to a receptacle or cup 17 dispensed for receiving the beverage. On the interior wall surface of the enclosure may be mounted a suitable control device responsive to the temperature of the interior of the enclosure, such as the sensing element 18a of a thermostat 18.

While any one of a number of different types of sugar dispensers (including the pressure-fed, liquid type) may be utilized in conjunction with the above described cream dispenser, a powdered or granular sugar dispenser 19 for use therewith is shown in Figs. 1, 2 and 3. Dispenser 19 is preferably of a type similar to that disclosed in our copending application Serial No. 504,491, filed April 28, 1955, now Patent No. 2,798,643, dated July 9, 1957, having a readily removable container 19a is mounted on the top of enclosure 11 to have its discharge means 19b extend slightly beyond a side wall 11c of enclosure 11 adjacent side wall 10c of the cream container. A suitable chute 20 extends downwardly alongside side wall 11c to conduct the sugar discharged from dispenser 19 to a point laterally below enclosure hole 11b. To direct the sugar into a cup 17 retained below passage 11b by suitable means, as support 17a, the lower end 20a of the chute is directed laterally or in a direction somewhat transversely of the path of flow of the cream into the cup, so that inertia of the sugar falling through the chute causes it to fall into the mid-portion of the cup. Thus the end of the chute may be disposed to the side of the path of the cream, and even laterally of the cup if desired, precluding its being splashed or otherwise contacted thereby while yet the sugar may be dispensed properly into the cup. In the embodiment of the drawings, end 20a is shown as a separate member, it being understood that it could be formed integrally with the chute as desired.

As described above, the cream dispenser comprises a tank from which the cream is dispensed by the action of its own hydrostatic pressure head forcing the cream through an opening in the bottom of the tank. Because this head varies with the amount of cream in the tank, the total quantity of cream dispensed by opening valve 15 for a given period of time will vary correspondingly. In our device means are provided for opening valve 15 a second time to dispense an additional quantity of cream when the level thereof has reached a predetermined point where the lowered head substantially affects the quantity dispensed. To this end, a cup dispenser 22, such as that disclosed in the co-pending application Serial No. 468,004, filed November 10, 1954, now abandoned, is provided, as shown in Figures 5 to 9. A switch 21 is mounted on cup dispenser 22 and arranged to control solenoid 16 to effect an additional opening of valve 15 whenever a predetermined number of cups 17 has been dispensed from dispenser 22. In the illustrated embodiment of the drawings, eight stacks of cups are originally provided with cup storage means 23 of cup dispenser 22 with each stack containing approximately eighty cups. We have found that, with a cream container as described holding approximately 1¾ gallons of cream, when approximately ½ of the cups have been dispensed, approximately ½ of the cream will have been dispensed, and therefore switch 21 is arranged to become operative when ½ of the cups have been dispensed. To this end, the switch is mounted slightly below a cup rail 22a on which the cup stacks rest, and is provided with an operating arm 21a which is spring biased to extend upwardly between the cup rails. The weight of the cup stacks is normally sufficient to maintain arm 21a in the depressed position preventing operation of the switch; however, when as seen in Figure 9, one-half of the cup stacks have been dispensed and no cup stack is disposed above the switch, arm 21a is allowed to move upwardly between the rails and energize the circuit to the solenoid 16. To regulate the time of the second opening of valve 15 through switch 21, a cam operated switch 24 is provided on a cup drop motor 25, which motor is provided for operating cup dispenser 22 to dispense a cup 17 to a position where it may receive the beverage and beverage ingredients. The normal operation of solenoid 16 to dispense the original quantity of cream from container 10 is controlled by a cam operated cream switch 26, as shown in Figure 10, which is arranged to effect dispensing of from 12 to 16 cubic centimeters of cream from tank 10. Cam switch 24 is arranged to provide a relatively smaller additional amount of cream which may be of the order of 4 cubic centimeters to compensate for the hydrostatic head drop.

As best seen in Figure 10 thermostat 18 is provided with a set of normally closed contacts 18b connected in series with a coin-reject means 27, herein shown as a normally energized relay device, across power supply lines such as L1 and L2. As long as reject means 27 is energized the beverage dispenser may be operated by the proper insertion of a coin. When, however, the temperature within enclosure 11 reaches a predetermined point, such as 50° F., contacts 18b are opened thereby breaking the circuit to the coin-reject means and preventing further operation of the beverage dispenser. At the same time a set of normally open contacts 18c of the thermostat is closed connecting a signal light 28 across the power lines L1 and L2 to indicate the non-functioning of the beverage dispenser. Thermostat 18 preferably requires manual resetting so that the reject relay is deenergized and light 28 is illuminated continuously even though the temperature within enclosure 11 drops subsequently below 50° F., as it has been found that once cream reaches this temperature there is high probability of its having been spoiled and subsequent lowering of the temperature does not recondition the cream, so that it must be discarded. Therefore, it is contemplated that in the operation of the beverage dispenser, once the thermostat has tripped, the cream in container 10 will be discarded and replaced with fresh cream, the thermostat being reset subsequent to this replacement.

Further reference being had to Figure 10, it may be seen that a cycle switch 29 is provided in the beverage dispenser to be in series with a parallel connection of cream switch 26 and switches 24 and 21 (switches 24 and 21 being connected in series as to each other) to control solenoid 16. A dial switch 30 is connected also in series in this circuit, serving to effect operation of the cream dispenser only when so selected by the consumer.

With dial switch 30 set to cream dispensing position, operation of the beverage dispenser by the consumer by means, such as inserting a coin therein, actuates, through suitable means (not shown), cycle switch 29 and cream switch 26 to operate solenoid 16 effecting the dispensing of beverage ingredient into a cup 17 dispensed from cup dispenser 22 by operation of cup dispensing motor 25. Should at least one-half of the cups originally placed in cup dispenser 22 have been previously dispensed, switch 21 will be closed, thereby providing energy through cup switch 24 to solenoid 16 to cause an additional operation of valve 15 to dispense a second quantity of cream from container 10. The cream, in passing from container 10 to cup 17, falls freely through outlet opening 10e and hole 11b so that there is no place in the discharge means for it to collect and deteriorate, thereby maintaining the cream delivery system clean at all times. Because the sugar dispensing chute terminates substantially laterally of the path of the cream and the sugar is carried in the cup only by following a trajectory from the end of the chute, the chute is also maintained free of collected material. Further, by mounting the sugar dispenser on the cream dispenser enclosure, a compact readily accessible structure is obtained allowing ready maintenance.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. In a beverage dispenser, apparatus for dispensing a liquid beverage ingredient and another ingredient into a receptacle, comprising: a first container for holding said liquid beverage ingredient and having an outlet in the bottom thereof; a refrigerated enclosure housing said container and having a side wall, and a bottom provided with an outlet opening therethrough near said side wall and aligned with said container outlet; valve means for controlling flow of said liquid ingredient through said outlet; means for disposing a receptacle directly below said outlet to receive liquid beverage ingredient falling freely from said outlet; a second container for holding a powdered beverage ingredient; means for securing said second container over said enclosure; and duct means juxtaposed to said side wall and extending from said second container to a point spaced substantially laterally of the path of flow of said liquid ingredient into said receptacle while allowing said powdered ingredient to fall into the receptacle, said first container being removably supported within the enclosure to be readily removable therefrom.

2. In a beverage dispenser, apparatus comprising: a container for holding a liquid beverage ingredient and having an outlet opening in the bottom thereof; valve means for controlling said opening; means for dispensing one at a time a plurality of cups to a position wherein each may receive beverage ingredient passed through said opening; means for actuating said valve means to open said valve means for a first predetermined period of time to allow a quantity of ingredient to pass into a dispensed cup under the force of the hydrostatic head of the ingredient in said container, said quantity of ingredient being substantially the desired amount during the first withdrawal of ingredient; and means associated with said cup dispensing means operative subsequent to the dispensing of a predetermined number of cups to operate said actuating means to open said valve means for a second predetermined period of time to allow a second quantity of ingredient to pass into the cup to compensate for the decrease in quantity passed during the first predetermined period of time due to decrease in the hydrostatic head.

3. In a beverage dispenser, apparatus comprising: a container for holding a liquid beverage ingredient and having an outlet opening in the bottom thereof; valve means for controlling said opening; a cup dispenser having a storage member for containing a plurality of cups and delivery means for dispensing cups from said storage member one at a time to a position wherein a dispensed cup may receive the beverage ingredient passed through said opening; means for actuating said valve means to open said valve means for a predetermined period of time to allow a quantity of ingredient to pass into a dispensed cup under the force of the hydrostatic head thereof in said container, said quantity of ingredient being substantially the desired amount during the first withdrawal of ingredient; and switch means associated with said cup dispenser arranged to actuate said actuating means, when a predetermined number of cups have been dispensed from said cup dispenser, to open said valve for an additional period of time to compensate for the decrease in quantity passed during said predetermined period of time due to the decrease in the hydrostatic head.

4. The beverage dispenser of claim 3 wherein said switch means is carried by said cup dispenser and is arranged to be operated when one-half of the cups stored in said dispenser have been dispensed.

5. The beverage dispenser of claim 3 wherein cups stored in said storage member are arranged to prevent operation of said switch means until a predetermined number thereof have been dispensed.

6. The method of dispensing a substantially constant volume of liquid to each of a plurality of receptacles, comprising the steps of: providing a plurality of receptacles; providing a quantity of liquid in a container having a controlled outlet opening in the bottom thereof, said quantity being predetermined to permit dispensing of a desired smaller quantity into each of a predetermined number of said receptacles; positioning one at a time each of said receptacles to receive liquid from said outlet opening; successively opening said outlet for a predetermined period of time to permit liquid to flow by gravity into each of the predetermined number of receptacles; and successively opening said outlet for an additional predetermined period of time to permit additional liquid to flow by gravity into each of a portion of the predetermined number of receptacles, said portion being the last portion of the number.

7. The method of dispensing a liquid as recited in claim 6, including the further step of dividing the plurality of receptacles into two halves, said portion comprising one of said halves.

References Cited in the file of this patent

UNITED STATES PATENTS

| | | |
|---|---|---|
| Re. 23,888 | Mateer | Oct. 26, 1954 |
| 1,558,634 | Rogers | Oct. 27, 1925 |
| 1,582,146 | Sproul | Apr. 27, 1926 |
| 1,630,203 | Middleton | May 24, 1927 |
| 1,639,679 | Zsoldos | Aug. 23, 1927 |
| 1,965,864 | Tempas | July 10, 1934 |
| 1,976,768 | Boileau | Oct. 16, 1934 |
| 2,019,016 | McLellan | Oct. 29, 1935 |
| 2,145,240 | Adams | Jan. 31, 1939 |
| 2,334,831 | Meyer et al. | Nov. 23, 1943 |
| 2,403,470 | Tull | July 9, 1946 |
| 2,537,119 | Bauerlein et al. | Jan. 9, 1951 |
| 2,546,879 | Wegman | Mar. 27, 1951 |
| 2,571,283 | Nicholson | Oct. 16, 1951 |
| 2,616,607 | Perkins | Nov. 4, 1952 |
| 2,621,838 | Price | Dec. 16, 1952 |
| 2,643,026 | Craig et al. | June 23, 1953 |
| 2,658,645 | Harris | Nov. 10, 1953 |
| 2,660,351 | Thompson | Nov. 24, 1953 |
| 2,682,984 | Melikian et al. | July 6, 1954 |
| 2,718,985 | Tamminga | Sept. 27, 1955 |
| 2,755,000 | Parre | July 17, 1956 |

FOREIGN PATENTS

| | | |
|---|---|---|
| 449,909 | Italy | July 5, 1949 |